Oct. 22, 1935.  E. H. FAHRNEY  2,018,014
HYDRAULIC CLUTCH
Filed Feb. 16, 1934  2 Sheets-Sheet 2

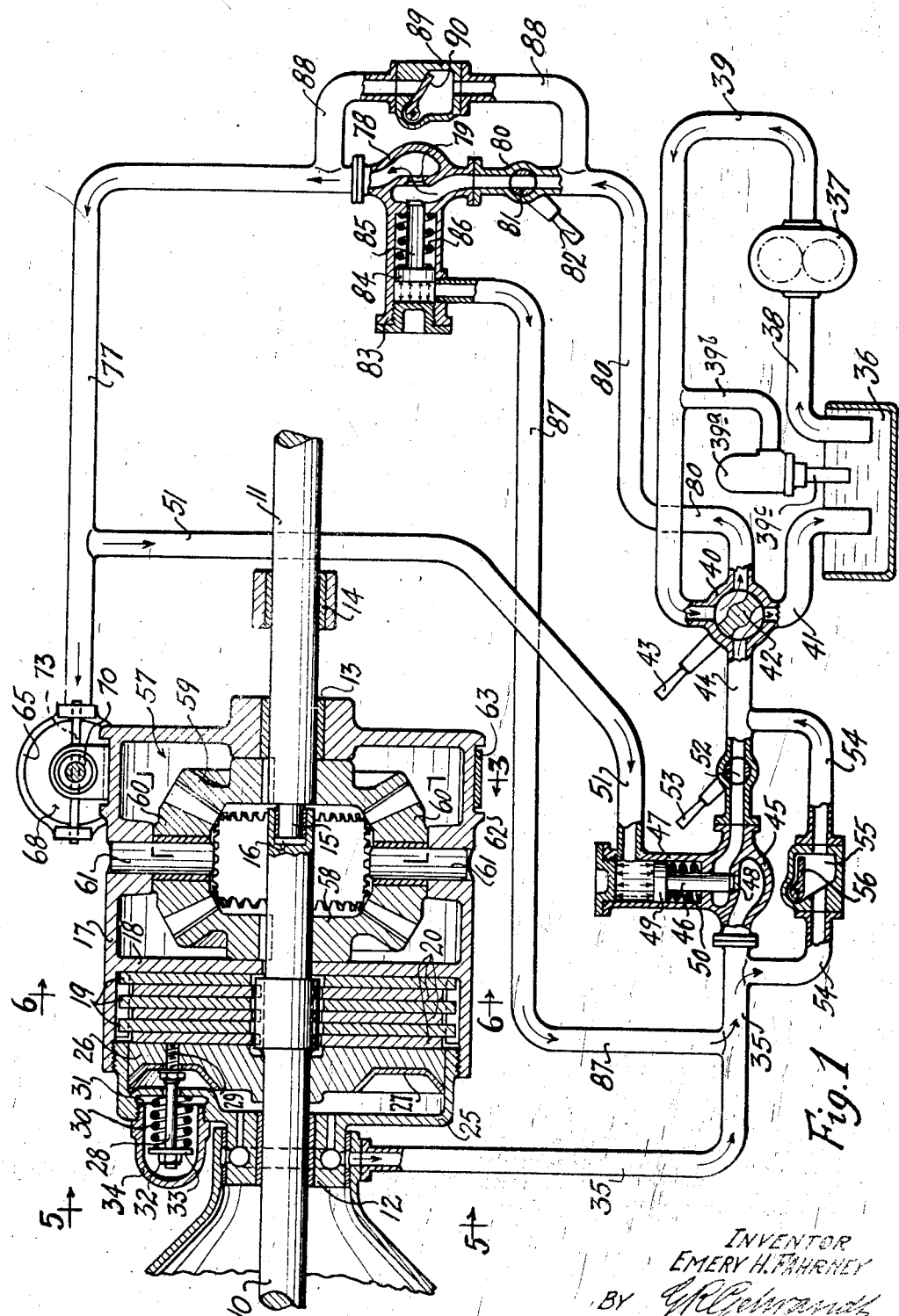

INVENTOR
EMERY H. FAHRNEY
BY *GHGehrands*
ATTORNEY

Patented Oct. 22, 1935

2,018,014

UNITED STATES PATENT OFFICE 2,018,014

HYDRAULIC CLUTCH

Emery H. Fahrney, Oak Park, Ill.

Application February 16, 1934, Serial No. 711,515

14 Claims. (Cl. 74—297)

This invention relates in general to hydraulic clutch mechanism for controlling the operation of forward and reverse gears, but more particularly the invention is concerned in a safety device or mechanism, by means of the use of which either the forward clutch mechanism or the reverse gear mechanism may be operated independently one with respect to the other.

It has frequently happened with hydraulically operated reverse gear mechanism that the pressure operating one clutch cannot be released quick enough, so that when the other or advancing clutch is being engaged, both of the clutches for the advance and reverse will be engaged, causing considerable damage.

In order to overcome these difficulties and objections and to provide an improved safety device or mechanism whereby the advance and reverse clutch devices cannot be rendered active simultaneously, but only in sequence, is one of the objects of the present invention.

A further object is to provide an improved device or mechanism of this character which will be of a comparatively simple and compact arrangement, and which will be efficient and effective in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a view partly in elevation, partly in section, partly broken away, and with parts removed, of a clutch control mechanism of this character constructed in accordance with the principles of this invention, and showing the mechanism set so that the advance mechanism is being released while the reverse gear mechanism is being rendered active.

Figure 6:
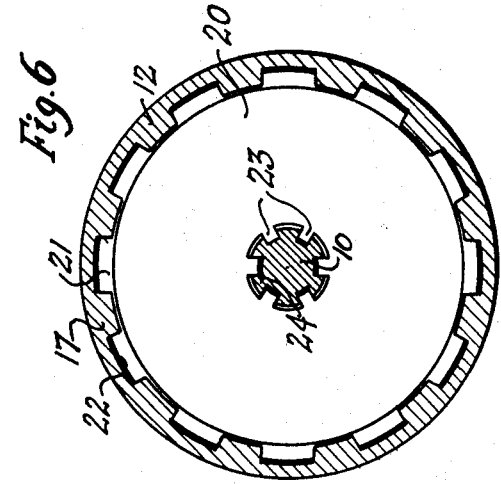
Figure 6 is a detail sectional view taken on line 6—6, Figure 1, with parts omitted.
Figure 5:
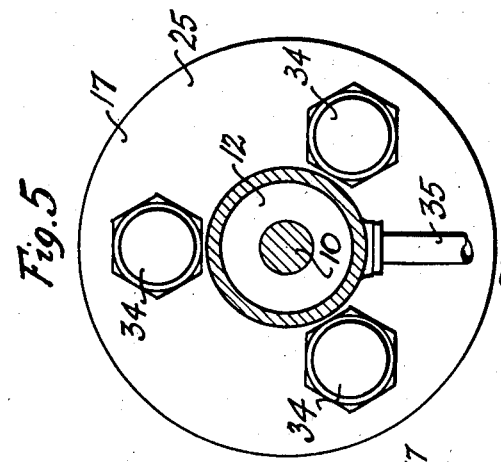
Figure 5 is a detail sectional view taken on line 5—5, Figure 1, with parts omitted.
Figure 4:
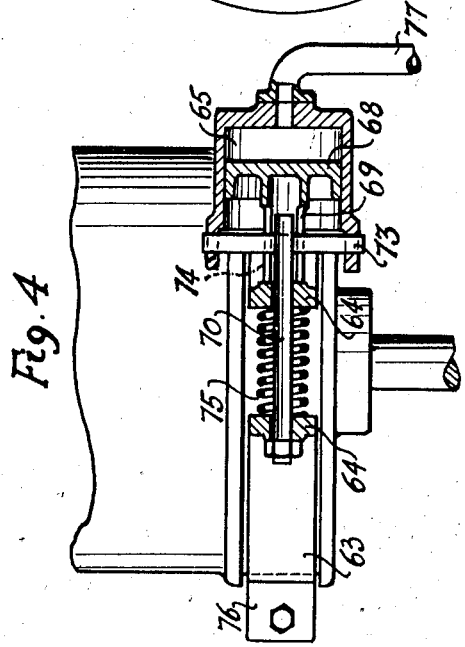
Figure 4 is a detail sectional view, on an enlarged scale, with parts omitted, and as taken on line 4—4, Figure 3.

Referring more particularly to the drawings the numeral 10 designates a driving shaft which receives its power from any suitable source, and 11 designates a driven shaft. The shaft 10 is mounted in suitable bearings 12 while the shaft 11 is journaled in suitable bearings 13 and 14. These shafts are arranged in alinement and one of the shafts is provided with a reduced end 15 which telescopes into the end of the shaft 10, as at 16.

The numeral 17 designates generally a clutch and gear housing or casing provided with a partition 18. On one side of the partition is arranged a series of spaced and alternately arranged friction discs 19—20. These discs encompass the driving shaft 10 and the discs 19 are provided with spaced peripheral projections 21 which enter grooves or recesses 22 in the wall of the housing 17, while the discs 20 are provided with projections 23 which enter grooves in a hub or enlarged portion 24 on the shaft 10, so that when the shaft 10 is rotated and the casing 17 is held against rotation, the discs 20 will be rotated with the shaft, and there will be a release of friction so that there will be a free rotation of one set of discs with respect to the other.

The portion of the housing 17 on the side of the partition 18 on which the discs 19 and 20 are located is closed by means of a closure 25, shaped to form a cylinder in which a piston 26 operates. A packing ring 27 is provided on the piston 26 and is preferably of a substantial U shape in cross section, and is seated within a recess in the face of the piston. The periphery of the packing ring 27 contacts with the wall of the cylinder to form a practically fluid tight joint.

The end of the cylinder or closure 25 is provided with a plurality of openings through which rods 28 pass, and these rods are secured by one end as at 29 to the piston and extend for any suitable distance beyond the end 25 of the cylinder. A spring 30 encompasses the rods 28 and rests in suitable recesses 31 and contacts with the end 25 of the cylinder. A nut 32 is threaded on the end of the rod, and the other end of the spring 30 preferably contacts with a washer 33 which encompasses the rod 28 and engages the nut 32.

Any number of these rods and springs may be provided and they operate to normally move the piston element 26 in a direction away from the discs 19 and 20 so as to permit them to rotate freely with respect to each other. When the piston 27 is forced in the opposite direction against the stress of the springs 30, in a manner to be set forth, it will move against the adjacent disc 20 and will force the discs 20 and 19 into contact with each other and will hold them sufficiently to cause friction therebetween so as to lock the housing 17 for rotation with the driving shaft 10.

A casing or cap 34 may be provided for covering the ends of the rods 28 and springs 30.

As the normal tendency of the springs 30 is to unlock or render the clutch formed by the discs 19—20 inactive, it is only necessary in order to lock the driving shaft 10 with the driven shaft 11, to render this clutch mechanism active by forcing the piston 26 in a direction to cause the friction discs to bind against each other. This is accomplished hydraulically through the medium of fluid pressure which is supplied to the cylinder 25 through a supply pipe 35 in a manner which will now be described.

The numeral 36 designates a sump for containing the fluid and 37 designates a pump of any suitable construction operated from any suitable source of power. The pump is connected to the sump 36 by means of a pipe 38 and leading from the pump is a discharge pipe 39 which has communication with a valve casing 40. Leading from the valve casing 40 is a discharge pipe 41 which also leads back to the sump 36.

Within the valve casing 40 is an operating valve 42 for controlling the clutches, and this valve 42 is actuated by means of an operating handle 43.

Leading also from the valve casing 40 is a pipe 44 which has communication with a valve casing 45, and with this valve casing 45 the pipe 35 also has communication.

A control valve 46 operates in a casing 47 which is connected to the valve casing 45 and controls the passage 48 in the valve casing 45 which forms communication between the pipe 44 and the pipe 35.

Connected to the valve 46 is a plunger 49 which operates in the casing 47, and a spring 50 is arranged within the cylinder 47 beneath the piston 49 and tends normally to move the valve 46 in a direction to open the passage 48 and thereby establish communication between the pipes 44 and 35.

Pressure is supplied to the cylinder 47 above the piston 49 to move the latter against the stress of the spring 50 and thereby move the valve 46 to close the opening 48, through a pipe 51 which receives its source of supply of pressure fluid from the pump 37, in a manner to be described.

Arranged within the pipe 44 and between the valve casing 45 and the valve casing 40, is a valve 52 controlled by an operating handle 53 and by means of which valve 52 the size of the passage in the pipe 44 leading to the valve casing 45, may be varied, so as to control or reduce the volume of fluid acting upon the plunger or piston 26, thus causing the clutch to act quickly or slowly, as desired.

A by-pass pipe 54 leads around the valve casing 45 and the valve 52 and is connected by one end to the pipe 35 and by its other end to the pipe 44 between the valve 52 and the valve casing 40, so that the fluid may pass around the valve casing 45. Within the pipe 54 is arranged a valve casing 55 within which is disposed a check valve 56, preferably of the flap type which will open to permit the fluid to flow in one direction but will be closed against the flow of the fluid in the opposite direction.

When pressure is admitted through the pipe 51 into the cylinder 47 above the piston 49, the valve 46 will be closed so that pressure will be relieved from the piston 26 and the pressure fluid will then flow through the pipe 35 in the direction indicated by the arrow in Figure 1, around the valve casing 45, through the valve casing 55, discharge pipe 44, through the valve casing 40, discharge pipe 41 back into the sump 36 when the lever 43 is in the position shown in Figure 1, thereby relieving pressure on the friction discs 19 and 20, so that the piston 26 will be moved under the stress of the springs 30 to release the clutch formed thereby.

It will therefore be seen that by manipulation of the lever 43 the operation of the clutch formed by the discs 19 and 20 will be controlled, and by operation of the lever 53, the position of the valve 52 will be changed, with the result that the flow of fluid will be restricted to prevent the clutch 26 from being thrown too quickly. The by-pass 54 and check valve 56 serve to provide a full opening of the pipe 54 in releasing the pressure from the piston 26 to provide for the quickest possible release.

Within the casing 17 on the other side of the partition 18 is a chamber 57 within which is arranged a driving gear 58 which is secured to the driving shaft 10 for rotation therewith, and a driven gear 59 which is secured to the driven shaft 11 for rotation therewith. These gears are spaced from each other laterally and disposed therebetween are planetary gears 60 which are journaled upon suitable trunnions or bearings 61 supported by the casing wall, and with the planetary gears both of the gears 58—59 mesh.

Figure 3:
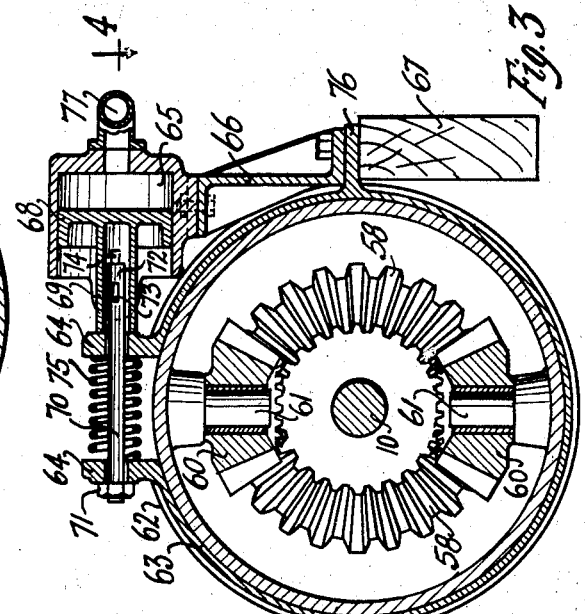
Figure 3 is a detail sectional view taken on line 3—3, Figure 1.

A portion of the outer surface of the casing 17 is recessed as at 62, and within this recessed portion is arranged a brake band 63 having lugs 64. A cylinder 65 (see particularly Figure 3) is supported by means of suitable brackets 66 mounted upon uprights 67. Within the cylinder 65 is a piston 68 provided with a tubular piston rod 69 which contacts with one of the lugs 64. A bar or rod 70 passes through the lugs 64 and is provided on one end with a nut or head 71 contacting with the outer face of one of the lugs, and the other end 72 of the bar telescopes into the piston rod 69. A pin 73 is anchored to the wall of the cylinder 65 and passes through slots 74 in the tubular piston rod 69 and also passes through the rod 70.

A spring 75 encompasses the rod 70 between the lugs 64 and tends normally to separate the lugs, thereby releasing the brake band and at the same time drawing the rod 70 forwardly so that the rod will move within the slot 74 in the piston rod and the lug 64 will tend to move the piston 68 into the cylinder 65. The brake band is held against rotation about the casing 17 preferably by means of lugs 76.

It will therefore be manifest that the normal tendency of the spring 75 is to separate the lugs 64 and thereby release the brake band, and at the same time move the piston 68 into the cylinder 65. This will happen when pressure is applied against the piston 26, in a manner to be described. Therefore, in order to apply the brake band 63 it is necessary to force the piston 68 forwardly in the cylinder 65 and cause the lugs 64 to be moved towards each other against the stress of the spring 75.

This is accomplished by means of fluid pressure supplied to the cylinder 65 through the pipe 77. This pipe 77 is connected to a valve casing 78 having an opening 79 therein to form communication with another pipe 80, which latter has communication with the valve casing 40.

A control valve 81 is arranged within the pipe 80 and a handle 82 is connected with the valve so that the volume of fluid delivered to the cylinder 65 may be varied by the adjustment or operation of the valve 81 by the handle 82.

Inasmuch as the pipe 80 is connected with the valve casing 40, it will be manifest that when the pump 37 is in operation the fluid will be drawn by the pump from the sump 36 through the pipe 38 and forced through the pipe 39 to the valve casing 40, and when the valve 42 is in the position shown in Figure 1, the fluid will then flow through the pipe 80, past the valve 81 into the valve casing 78, through the opening 79, and through the pipe 77 into the cylinder 65.

Connected with the valve casing 78 is a cylinder 83 within which is arranged a piston 84 connected to a valve 85 and which valve 85 controls the opening 79. A spring 86 is arranged between the piston 84 and one end of the cylinder 83 and tends normally to move the valve 85 in a direction to open the passage 79. In order to close the opening 79, the valve 85 must be moved against the stress of the spring 86 and this is accomplished by fluid pressure which is supplied through a pipe 87 which communicates with the cylinder 83 above the piston 84, and this pipe in turn has communication with the pipe 35 beyond the valve 46 and the connection of the pipe 54 with the pipe 35, so that when fluid pressure upon the piston 26 is relieved, fluid pressure upon the piston 84 will also be relieved, and this will permit the spring 86 to unseat the valve 85 to open the passage 79 so that fluid pressure through the pipe 80 will be delivered to the cylinder 65 through the valve casing 78 and pipe 77. Connected with the pipe 77 beyond the valve casing 78 is the other end of the pipe 51 which has communication with the cylinder 47 in which the piston 49 controlling the valve 46 operates, with the result that when the fluid pressure is forced through the pipe 80 when the valve 42 is in the position shown in Figure 1, a part of the pressure or fluid will be directed into the cylinder 65 and at the same time a part of the pressure fluid will be directed from the pipe 77 through the pipe 51 into the cylinder 47 to close the valve 46. It will therefore be manifest that as soon as pressure is applied in the cylinder 65, the valve 46 will be closed, cutting off pressure against the piston 26 and the pressure fluid from the cylinder 25 will then flow through the pipe 35, pipe 54, around the valve casing 45, past the valve 56, through the valve casing 40 and back into the sump through the discharge pipe 41.

A pipe or passage 88 is connected by one end to the pipe 80 and extends around the valve 81 and valve casing 78, and has communication with the pipe 77. Arranged within this pipe 88 is a valve casing 89 in which a check valve 90 operates and which check valve is preferably of the flap type, opening in one direction to permit the fluid to flow through the pipe 88 and closing the pipe against the return flow of the fluid therethrough.

Figure 2:
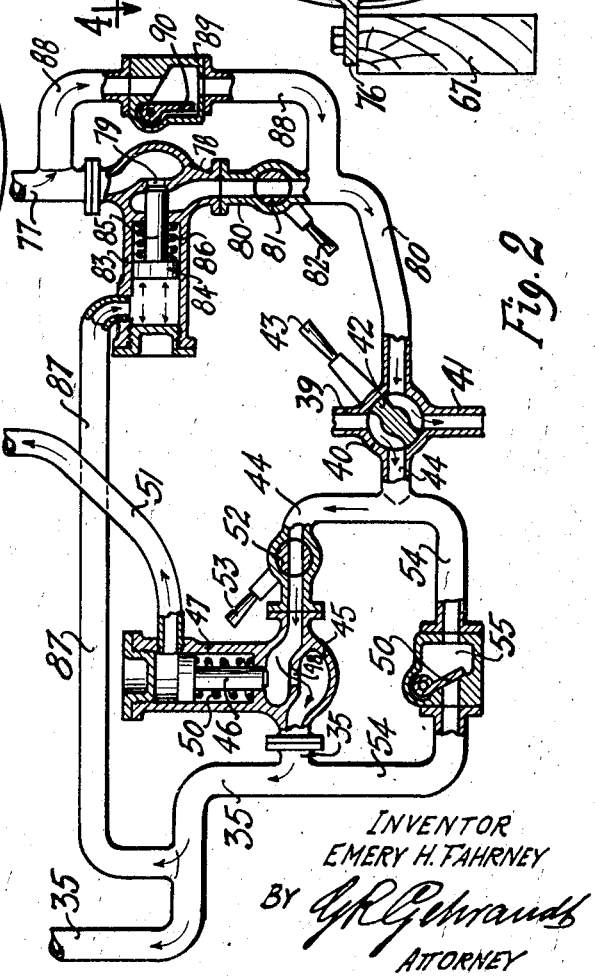
Figure 2 is a view of the safety or control mechanism, similar to that shown in Figure 1, with parts omitted, and showing the mechanism set so as to render the reverse control clutch inactive and the advancing control clutch being rendered active.

When the valve 42 is in the position shown in Figure 2, which will be the position to cause the clutch discs 19 and 20 to become active and the brake band 63 to become inactive, the fluid will be forced by the pump 37 through the pipe 39, through the valve casing 40, into the pipe 44, past the valve 52, through the valve casing 45 into the pipe 35, and thence against the piston 26. At the same time a part of the fluid pressure will be delivered through the pipe 87 into the cylinder 83 to move the valve 85 to close the opening 79. This will cut off the fluid pressure from the cylinder 65, with the result that the fluid pressure will be relieved from this cylinder through the pipe 77, by-pass 88, past the flap valve 90, pipe 88, pipe 80, through the valve casing 40 and through the pipe 41 into the sump 36.

It will therefore be manifest that with this construction there will be a safety device provided by means of the use of which it will be impossible to apply the reverse gear controlling brake band 63 simultaneously with the rendering of the clutch formed by the friction discs 19 and 20 active, and the pressure will be controlled by the actuation of the single control lever 43. Thus if the valve 42 is in a neutral position, that is in a position to close the pipes 39 and 41, and assuming that the pump 37 is in operation, the circulation of the liquid will be from the sump 36 through pipe 38, pump 37 and into pipe 39.

But, as the pipe 39 is closed by the valve 42, the liquid will flow through the pipe 39$^b$ into the valve chamber 89$^a$, and the valve in this chamber will open and the liquid will escape under excess pressure into the sump 36.

If the valve 42 is now moved from the neutral position to that shown in Figure 1, the circulation will be as follows:

Pipe 44 will be connected with the sump through pipe 41, and pipe 39 will be connected with pipe 80 through the valve casing 40.

As the piston 84 of the valve 85 is then cut off from the influence of the pump 37, the spring 86 will open the valve 85.

The flow of the liquid will then be from the pump 37, through the pipe 39, valve casing 40, pipe 80, the valve opening 79 in the valve casing 78, into pipe 77, thence into cylinder 65 where it will act upon the piston 68 to apply the brake band to hold the casing 17 against rotation.

At the same time fluid pressure will flow from pipe 77, through pipe 51 to act upon the piston 49 of the valve 46 and thereby close the valve 46 against the stress of the spring 50, thereby closing the opening 48.

In this position of the valves 42—85 and 46, there will be no fluid pressure from the pump 37 against the piston 26.

If now the valve 42 is moved from the position shown in Figure 1 to the position shown in Figure 2, pressure will be relieved from the cylinder 65 and the pressure will be exerted upon the piston 26. However, before such pressure can be applied to piston 26, it is necessary that the valve 46 should open the valve opening 48, which is only possible by releasing the pressure back of the piston 49. This will be accomplished through the pipe 51, pipe 77 and the by-pass 88, through pipe 80, valve casing 42, pipe 41, back to the sump 36. This operation opening the valve 46 will be accomplished automatically when the pressure of the fluid against the piston 49 of the valve 46 is less than the stress of the spring 50 which opens the valve 46.

It will therefore be manifest that the device is controlled by valves 46 and 85 which function automatically due to fluid pressure, in such a manner that either the clutch piston 26 or the cylinder 65 will be relieved from fluid pressure at the will of the operator and before either the piston in the cylinder 65 or clutch member 26 will be actuated by fluid pressure from the pump 37. This will render it impossible for the cylinder 65 and the clutch member 26 to simultaneously receive actuating pressure from the pump 37. As soon as the lever 43 is actuated to move the valve 42 from the position shown in Figure 1, and which valve serves as a master control, it will be manifest that the first operation which occurs will be to close the pipe 39 which leads from the pump 37, for a short period of time. By a further movement of the valve 42 in the same direction, the pipe 80 which is the relief pipe from the cylinder 65 will be connected with the discharge pipe 41 and connection will be established between the pressure supply pipe 39 and the pipe 44, through which pressure is supplied to the piston 26 to control the clutch elements 19—20.

Likewise when the valve 42 is moved from the position shown in Figure 2, back to the position shown in Figure 1, pressure will be relieved from from the piston 26, before pressure is applied in the cylinder 25 to render the brake band 63 active.

When the clutch mechanism including the disc elements 19—20 is rendered active there will be a direct forward drive, that is the driven shaft 11 will be locked to the driving shaft 10 for rotation in the same direction, and the planetary gears 60 will be bodily rotated. When, however, the clutch device 19—20 is rendered inactive and the brake band 63 rendered active, the planetary gears 60 will rotate as the casing 17 will be held stationary and the gears 60 rotated about their axes, thereby causing a reverse direction of rotation to be imparted to the driven shaft 11 with respect to the driving shaft 10.

If desired, and in order to relieve the pressure created by the pump 37, a pressure relief valve 39ª may be provided as an excess pressure relief device, and which valve may be of the ordinary and well known construction, one side of the valve being connected by a pipe 39ᵇ with the pipe 39 and leading from the other side of the valve is a pipe 39ᶜ which discharges into the sump 36.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In combination a driving element having a constant direction of rotation, a driven element, a forward drive clutch connection and a reverse drive connection between said elements, fluid pressure controlled means individual to said connections for controlling them, a master control common to the said pressure controlled means, and fluid pressure controlled means individual to said connections and operating when said master control is actuated to cause one of said connections to become inactive when the other becomes active, a portion of the fluid pressure which operates to cause either of said connections to become active, also operating to render the last recited fluid pressure controlled means of the other of said connections active.

2. In combination a driving element having a constant direction of rotation, a driven element, a forward drive clutch connection and a reverse drive connection between said elements, fluid pressure controlled means individual to said connections for controlling them, a master control common to the said pressure controlled means, means operating automatically upon the actuating of said master control for causing one of said connections to become active only upon the other of said connections becoming inactive, and means adapted to be set at will for varying the degree of fluid pressure with respect to the said fluid pressure controlled means.

3. In combination a driving element having a constant direction of rotation, a driven element, a forward drive clutch connection and a reverse drive connection between said elements, fluid pressure controlled means individual to said connections for controlling them, a master control common to the said pressure controlled means, and fluid pressure controlled means individual to said connections and operating when said master control is actuated to cause one of said connections to become inactive when the other becomes active, a portion of the fluid pressure which operates to cause either of said connections to become active, also operating to render the last recited fluid pressure controlled means of the other of said connections active, the last recited fluid pressure controlled means embodying a fluid pressure controlled valve in the fluid pressure supply line, and a valved fluid pressure by pass around the last said valve.

4. In combination, a driving element having a constant direction of rotation, a driven element, a forward drive clutch connection and a reverse drive connection between said elements, means individual to said connections for controlling them, means common to said controlling means for controlling them, and means responsive in its operation to the actuation of the first recited means and operating automatically to maintain either of said connections against being rendered active when the other of said connections is rendered active.

5. In combination, a driving element having a constant direction of rotation, a driven element, a forward drive clutch connection and a reverse drive connection between said elements, means individual to said connections for controlling them, fluid pressure means common to said controlling means for controlling them, and fluid pressure controlled means responsive in its operation to the first recited fluid pressure means and operating automatically to maintain either of said connections against being rendered active when the other of said connections is rendered active.

6. In combination a driving element having a constant direction of rotation, a driven element, a forward drive clutch connection and a reverse drive connection between said elements, fluid pressure actuated means individual to the said connections for controlling them, means common to said fluid pressure actuated means for controlling them, and means controlled by a portion of the fluid pressure which renders either of said connections active, operating to maintain the other of said connections against the active pressure of the fluid.

7. In combination, a driving element having a constant direction of rotation, a driven element, a forward drive clutch connection and a reverse drive connection between said elements, a source of supply of fluid under pressure, fluid controlled means individual to said connections, a pipe line connection individual to said connections and each leading from said source of supply and through which pipes the fluid is adapted to flow forwardly and backwardly, means common to said pipe line for controlling the direction of flow of the fluid therethrough, a fluid pressure controlled valve in each of said pipe lines, means tending normally to open said valves, and a pipe connection between each of said valves and one of said pipe lines whereby when fluid pressure is directed to the fluid pressure controlling means of one of said connections the said valve in the pipe line leading to the fluid controlled means controlling the other of said connections will be closed to cut off the fluid pressure to the last said connection.

8. In combination, a driving element having a constant direction of rotation, a driven element, a forward drive clutch connection and a reverse drive connection between said elements, a source of supply of fluid under pressure, fluid controlled means individual to said connections, a pipe line connection individual to said connections and each leading from said source of supply and through which pipes the fluid is adapted to flow forwardly and backwardly, means common to said pipe lines for controlling the direction of flow of the fluid therethrough, a fluid pressure controlled valve in each of said pipe lines, means tending normally to open said valves, a pipe connection between each of said valves and one of said pipe lines whereby when fluid pressure is directed to the fluid pressure controlling means of one of said connections the said valve in the pipe line leading to the fluid controlled means controlling the other of said connections will be closed to cut off the fluid pressure to the last said connection, and an additional valve in each of said pipe lines for controlling the fluid pressure therethrough.

9. In combination, a driving element having a constant direction of rotation, a driven element, a forward drive clutch connection and a reverse drive connection between said elements, a source of supply of fluid under pressure, fluid controlled means individual to said connections, a pipe line connection individual to said connections and each leading from said source of supply and through which pipes the fluid is adapted to flow forwardly and backwardly, means common to said pipe lines for controlling the direction of flow of the fluid therethrough, a fluid pressure controlled valve in each of said pipe lines, means tending normally to open said valves, a pipe connection between each of said valves and one of said pipe lines whereby when fluid pressure is directed to the fluid pressure controlling means of one of said connections the said valve in the pipe line leading to the fluid controlled means controlling the other of said connections will be closed to cut off the fluid pressure to the last said connection, a by pass around each of said valves, and a one way flow valve in each of said by passes.

10. In combination, a driving element having a constant direction of rotation, a driven element, a forward drive clutch connection and a reverse drive connection between said elements, a source of supply of fluid under pressure, fluid controlled means individual to said connections, a pipe line connection individual to said connections and each leading from said source of supply and through which pipes the fluid is adapted to flow forwardly and backwardly, means common to said pipe line for controlling the direction of flow of the fluid therethrough, a fluid pressure controlled valve in each of said pipe lines, means tending normally to open said valves, and a pipe connection between each of said valves and one of said pipe lines whereby when fluid pressure is directed to the fluid pressure controlling means of one of said connections the said valve in the pipe line leading to the fluid controlled means controlling the other of said connections will be closed to cut off the fluid pressure to the last said connection, said source of supply under pressure comprising a sump, a pump, a supply pipe from the sump to the pump, and a discharge pipe from the pump to the sump and with which discharge pipe said pipe lines have connection.

11. In combination, a driving element having a constant direction of rotation, a driven element, a forward drive clutch connection and a reverse drive connection between said elements, hydraulic mechanism for simultaneously controlling said connections, the said mechanism embodying means whereby said connections will be maintained against becoming simultaneously active, and a pressure relief valve for the said hydraulic mechanism.

12. In combination, a driving element having a constant direction of rotation, a driven element, a forward drive clutch connection and a reverse drive connection between said elements, hydraulic means for simultaneously controlling said connections, the said hydraulic means embodying means operating automatically to always cause one of said connections to be rendered inactive in advance of the other of said connections being rendered active, and a pressure relief valve for the said hydraulic mechanism.

13. In combination, a driving element having a constant direction of rotation, a driven element, a forward drive clutch connection and a reverse drive connection between said elements, means individual to said connections for controlling them, fluid pressure means common to said controlling means for controlling them, fluid pressure controlled means responsive in its operation to the operation of the first said fluid pressure means and operating automatically to maintain either of said connections against being rendered active when the other of said connections is rendered active, and a pressure relief valve for the said fluid pressure means.

14. In combination, a driving element having a constant direction of rotation, a driven element, a forward drive clutch connection and a reverse drive connection between said elements, means individual to said connections for controlling them, fluid pressure means common to said controlling means for controlling them and embodying a pressure creating pump, fluid pressure controlled means responsive in its operation to the operation of the first recited fluid pressure means and operating automatically to maintain either of said connections against being rendered active when the other of said connections is rendered active, and a fluid pressure relief for said pump.

EMERY H. FAHRNEY.